April 30, 1946.   C. D. PETERSON ET AL   2,399,567
CONTROL SYSTEM FOR CHANGE SPEED TRANSMISSION GEARING
Filed Aug. 21, 1943   5 Sheets-Sheet 1

INVENTORS
CARL D. PETERSON
ALBERT H. DEIMEL
BY
ATTORNEYS

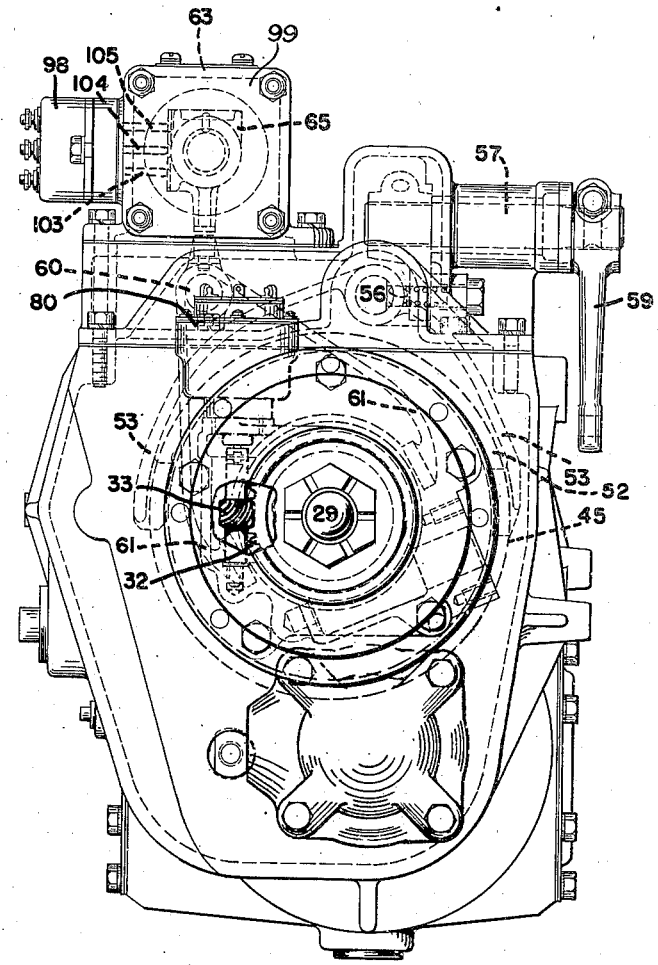

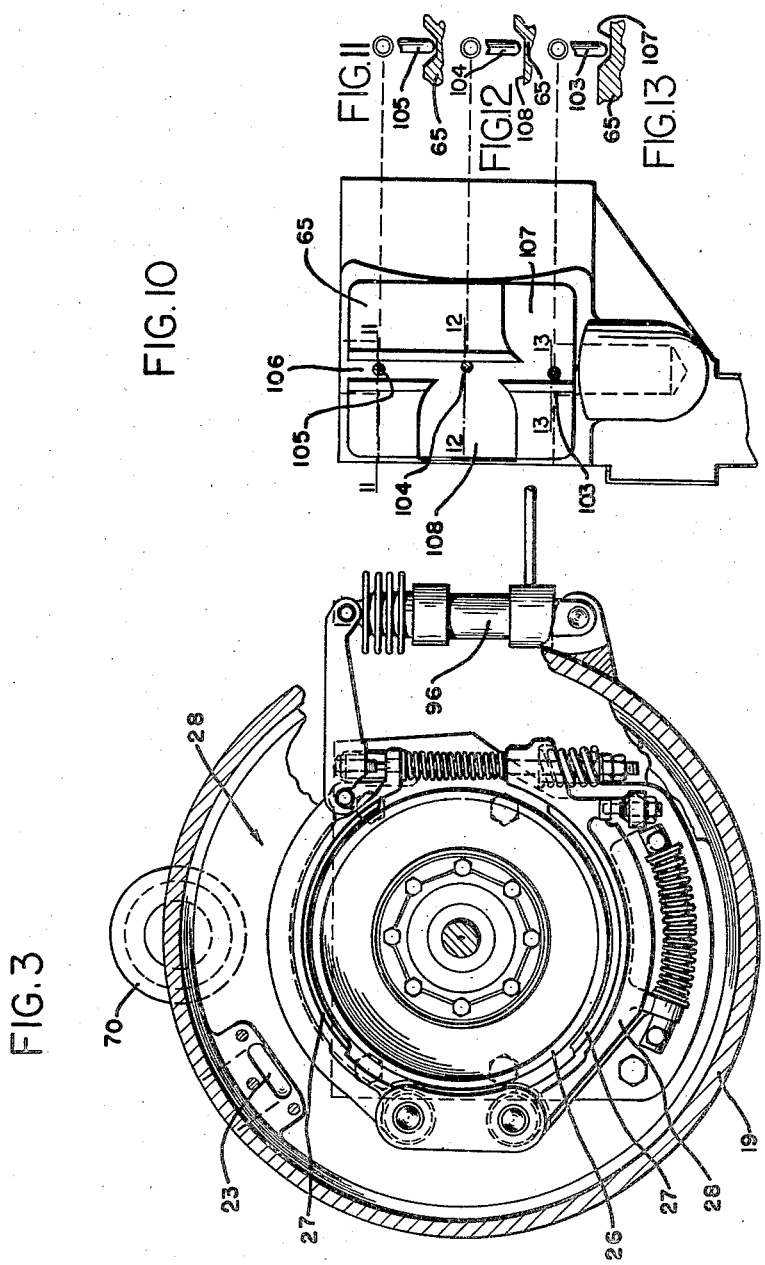

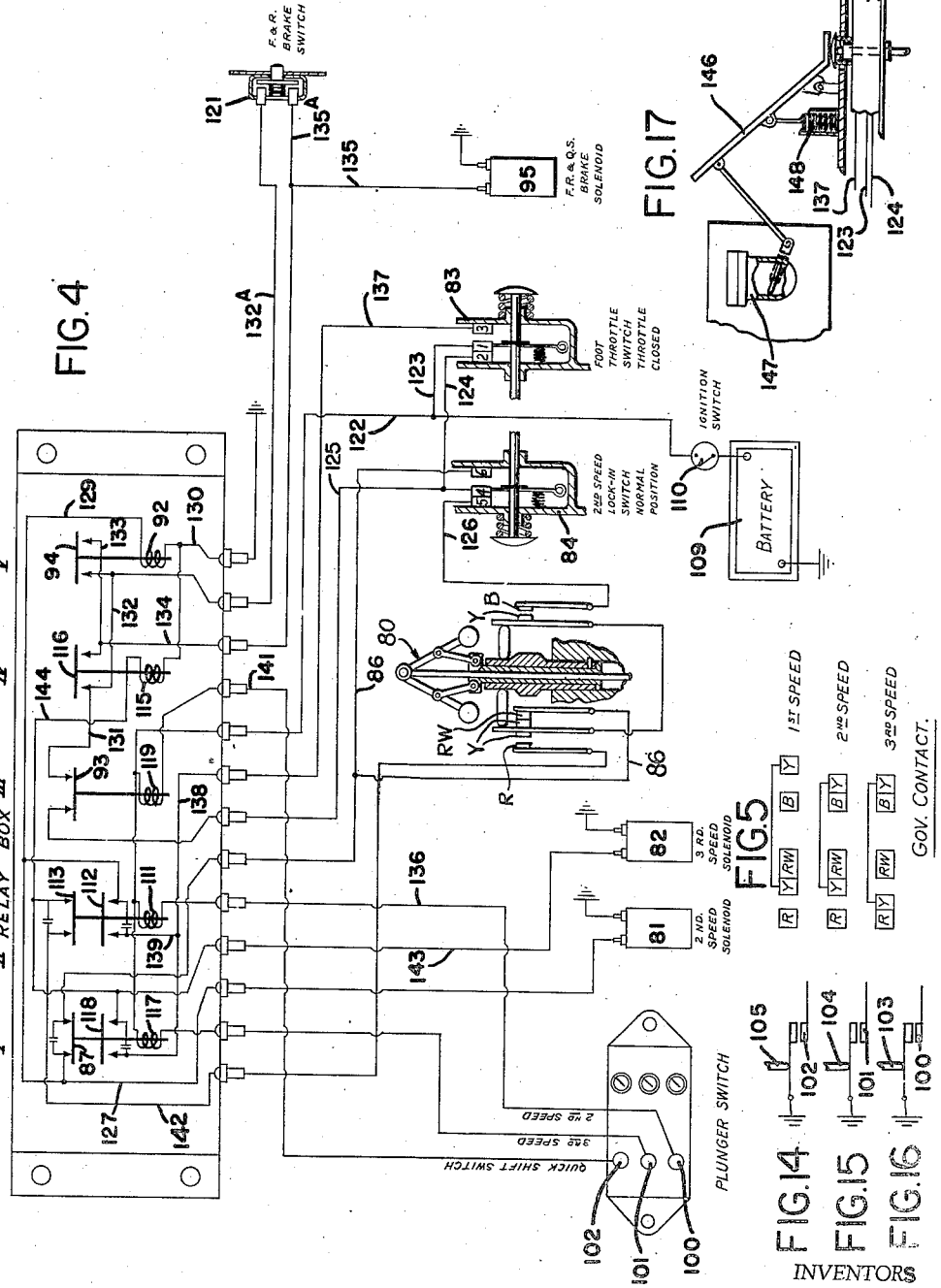

April 30, 1946.　　C. D. PETERSON ET AL　　2,399,567
CONTROL SYSTEM FOR CHANGE SPEED TRANSMISSION GEARING
Filed Aug. 21, 1943　　5 Sheets-Sheet 5
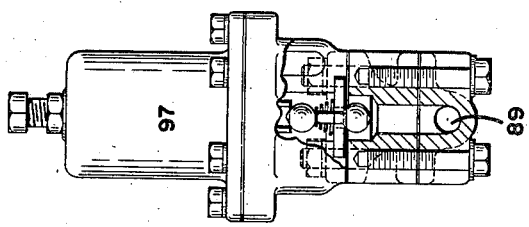
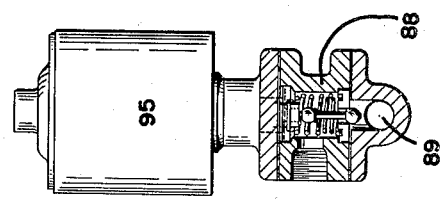
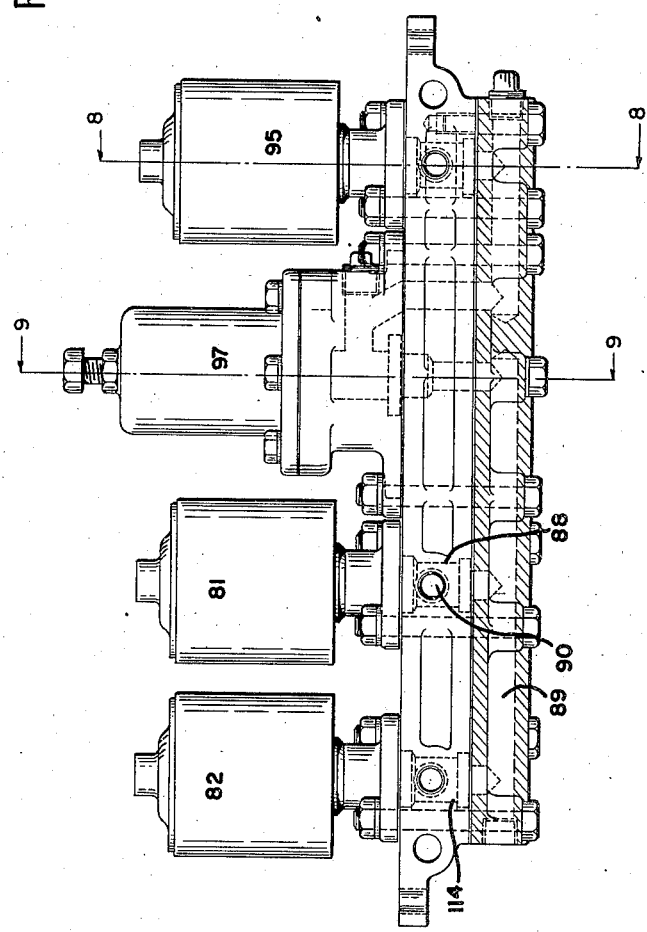
INVENTORS
CARL D. PETERSON
ALBERT H. DEIMEL
BY
ATTORNEYS Patented Apr. 30, 1946

2,399,567

UNITED STATES PATENT OFFICE 2,399,567

CONTROL SYSTEM FOR CHANGE-SPEED TRANSMISSION GEARING

Carl D. Peterson and Albert H. Deimel, Toledo, Ohio

Application August 21, 1943, Serial No. 499,512

10 Claims. (Cl. 192—01)

This invention relates to controls for change-speed gearings in which at least some of the shiftable elements, as clutches, of the gearing are shifted by power, and has for its object an electrical control system operated partly by an output speed controlled switch and an engine throttle controlled switch, in such a manner that a shift can not be made or initiated through the output speed operated, or governor switch, unless the engine throttle is first closed. It also has for its object the foregoing electrical control system embodying means as a power brake operable to effect a quick crossing of the speeds during an up shift, which means is controlled partly by the throttle controlled switch and operable only when the throttle controlled switch is in throttle closed position, and partly by the selected clutch being shifted part way toward, but short of, engaged position. As the clutches are preferably of the balking ring type, said means is controlled partly by the shift to balk position.

Other objects appear throughout the specification.

The invention consists in the novel features and in the combinations and construction hereinafter set forth and claimed.

In describing this invention, reference is had to the accompanying drawings in which like characters designate corresponding parts in all the views.

Figure 2 is an end elevation looking to the left in Figure 1.

Figure 3 is a sectional view approximately on line 3—3, Figure 1, illustrating the brake mechanism.

Figure 4 is a diagrammatic view of the control system.

Figure 5 is a chart illustrating the contacts of the speed governor switch of the control system in first, second and third speeds.

Figure 7 is an elevation partly in section showing the unit in which the solenoids and the valves operated thereby are embodied.

Figure 1:
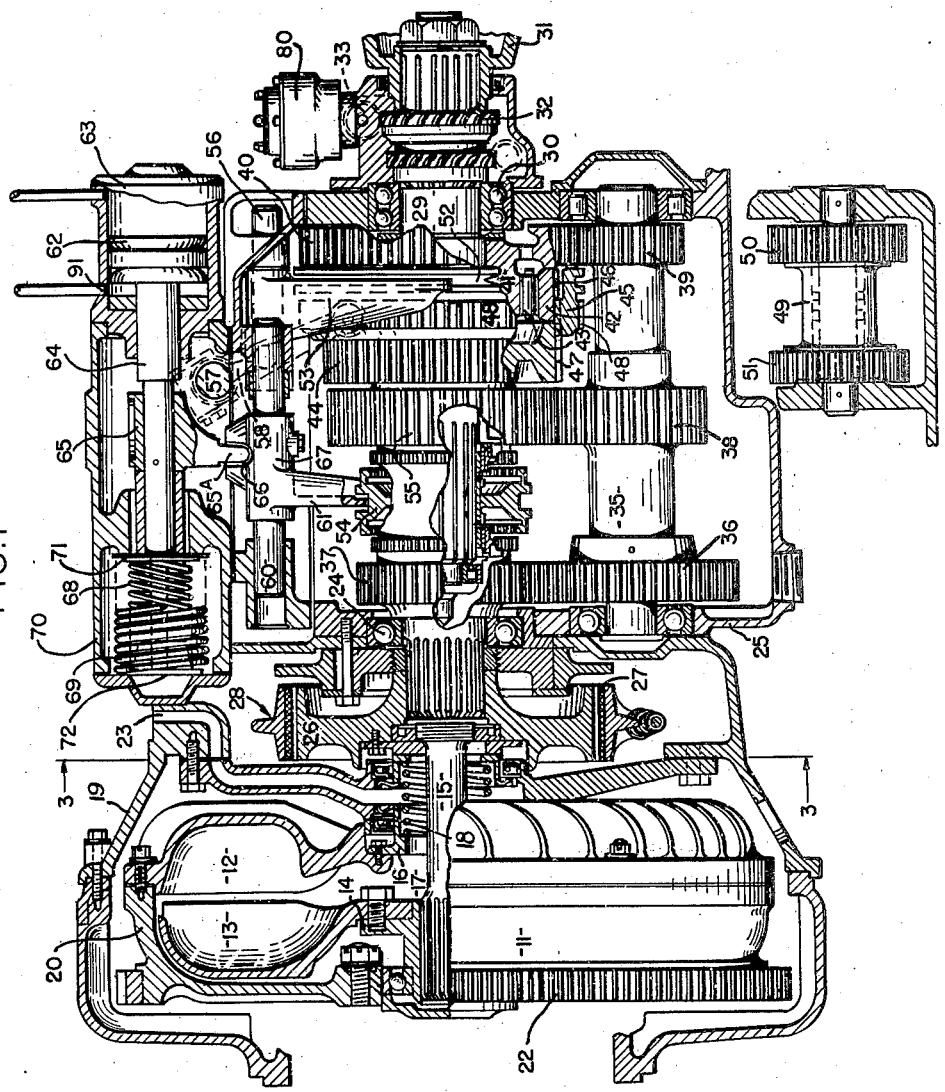
Figure 1 is a longitudinal sectional view of a gearing embodying this invention.
Figure 6:
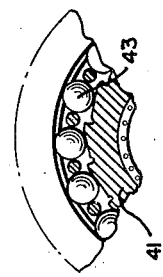
Figure 6 is a fragmentary sectional view of the overrunning clutch.

Figures 8 and 9 are sectional views on lines 8—8 and 9—9, respectively, Figure 7.

Figure 10 is a face view of the cams on the cam block on the rod of the shift piston for operating the plunger switches which control the sustaining circuits for the second and third speed shift solenoids and the solenoid for the quick shift brake.

Figures 11, 12 and 13 are fragmentary sectional views on lines 11—11, 12—12, and 13—13, Figure 10.

Figures 14, 15 and 16 are diagrammatic views of the switches operated by the plungers.

Figure 17 is a diagrammatic view showing the engine throttle accelerator pedal and connection between it and the throttle controlled switch of the shift control system of the gearing.

The transmission unit may be of any suitable construction, and it is here shown as including a hydraulic coupling for transmitting the power of the engine to the bearing.

11 designates the hydraulic coupling, this including an impeller 12, a runner 13 having a hub 14 splined on a runner shaft 15, which is also the input shaft of the transmission gearing. The shaft 15 extends through the impeller 12 axially therewith, the impeller 12 including a hub portion 16 spaced from the shaft 15 and thereby forming an annular hydraulic fluid or oil passage 17 around the runner shaft 15. The hub portion 16 embodies suitable oil seal bearings 18 interposed between it and an outside enclosing casing 19. The impeller also has a portion 20 enclosing the runner and having means of any suitable construction for coupling to a drive shaft, as the crank shaft of the engine. The coupling is a fluid fly wheel and is provided with a ring gear 22 for coacting with the starting mechanism. The construction of the coupling forms no part of this invention. The interior of the coupling communicates with an outside tank through a passage 23, the passage communicating with the passage 17. The construction of the coupling forms the subject matter of our Patent No. 2,334,282 issued November 16, 1943. The runner shaft 15 is journalled at its rear end in suitable bearing 24 in the front wall of the gear box 25, this front wall being spaced from the casing 19 for the hydraulic coupling. In this space is mounted brake mechanism including a brake drum 26 having a hub splined on the shaft 15, a brake band 27 encircling the brake drum 26 and means designated generally 28 in Figure 3 for applying the brake for effecting the quick shift into higher speeds to be hereinafter described.

The brake mechanism is of the general type shown in patent to Peterson & Deimel, No. 2,276,862, issued March 17, 1942, or Patent No. 2,260,580, issued October 28, 1941.

The gearing includes the usual transmission shaft, countershaft, coacting gears on the shafts, a reverse gear train and shiftable elements, as clutches, shiftable to clutch different gears to their shafts to effect first, second and third speeds forward and reverse. The transmission shaft 29 is journalled in the usual manner at its front end in the input shaft 15 or the gear thereon and at its rear end in suitable bearings 30 in the rear wall of the gear box 25. The shaft 29 extends beyond the rear end of the gear box and has one section 31 of a universal joint at its rear end for connection to the propeller shaft of the vehicle. The projecting end of the shaft 29 also has a gear 32 thereon meshing with the gear 33 which drives the governor switch 80. 35 designates the countershaft having a gear 36 keyed thereto or fixed thereon and meshing with a gear 37 on the rear end of the runner shaft 15. This gear and the runner shaft constitutes a stem gear. The countershaft also has a gear 38 thereon and a gear 39, the latter meshing with a gear 40 rotatable about the transmission shaft, this gear 40 having a hub 41 which constitutes the inner race of an overrunning clutch, including an outer race 42 and rollers 43 between the races. The transmission shaft also has a clutch gear 44 thereon axially spaced from the gear 40 and opposed thereto, with which coacts a sliding clutch collar 45 having internal teeth 46 interlocking with peripheral teeth 46 on the outer race 42, and shiftable axially into and out of clutching engagement with the clutch teeth 47 of the clutch gear 44. The clutch collar 45 is provided with peripheral gear teeth 48. First speed forward is effected through the overrunning clutch when shifted to clutch the outer race 42 and the clutch gear 44 together. Reverse gear is effected through a reverse spool 49 having one of its gears 50 meshing with the countershaft gear 39 and its other gear 51 meshing with the gear teeth 48 on the clutch collar 45, when the clutch collar 45 is shifted into interlocking engagement with the clutch gear 44 and out of engagement with the outer race 42.

The clutch collar 45 is formed with a groove 52 in which works a shifting fork 53. Shifting of the clutch collar 45 to the right or into the position shown in Figure 1 clutches the outer race 42 to the clutch gear 44, so that the drive is from the shaft 15 through the gears 37, 36, countershaft 35, gear 39, gear 40 to the inner race 41 through the rollers 43 of the overrunning clutch to the outer race 42, thence through the clutch collar 45 to the clutch gear 44. Shifting of the clutch collar 45 to the left unclutches the outer race 42 and shifts the gear teeth 48 of the clutch collar 45 into mesh with the gear 51 of the reverse spool, so that the drive is from the countershaft gear 39 through the reverse spool, clutch collar 45 and clutch gear 44 in the reverse direction. During this operation, the gear 40 idles, as it is unclutched from the clutch collar 45. A position midway between forward and reverse position of the clutch collar 45 is neutral position in which the clutch collar is entirely unclutched from the clutch gear.

Second speed and third speed or direct drive is effected through a double clutch 54 slidably splined on the transmission shaft and operable in opposite directions from neutral to clutch a gear 55 rotatably mounted on the transmission shaft to the transmission shaft to produce second speed, and in the opposite direction, as to the left, to clutch the runner or input shaft 15 and the transmission shaft directly together. This clutch 54 is a balking ring clutch, and as is well understood, the balking ring is an annular locking bolt which positively blocks the shifting in of jaw or toothed faces of the balking ring clutch, until the speeds cross. The balking ring has a friction face coacting with a complemental friction face on the part with which the clutch coacts, the friction being sufficient only to shift the balking ring into locked and unlocked position. When the speeds of the two parts to be clutched together are different, the balking ring is in locked position, and the speeds are crossed by decelerating the engine in an up shift or accelerating it during a down shift. In an up shift, the drive section of the clutch actuated by the engine, or in this case, by the runner shaft, slows to a speed slightly less than the shaft to be clutched thereto, as the transmission shaft, and the balking ring, due to its friction, is controlled by the driving section of the clutch and is drawn back by it, thus shifting the balking ring to unlocked position.

The clutch 54 being double includes a balking ring at each end thereof. The fact that balking ring clutches are used in this transmission should be borne in mind in connection with the control system. As the principle and operation of balking ring clutches are well understood, further description is thought to be unnecessary.

The balking ring clutch 54 is shifted by power. The clutch collar 45 is preferably shifted by hand to produce first and reverse speeds. When the clutch 54 is shifted to the right, second speed is effected through the gears 37, 36, countershaft gear 35, gear 38 and gear 55. When the clutch 54 is shifted to the left, it coacts with clutch teeth on the gear 37, which is usually integral with the runner or input shaft 15.

The clutch collar 45 is shifted by a shift rod 56 (Figure 2) suitably mounted in the cover of the gear box and carrying the fork 53. The shift rod 56 is shifted by a rock shaft 57 extending transversely of the shift rod 56 and having a rock arm or finger 58 coacting with a suitable block on the shift rod 56. The shaft 57 is driver or operator operated, and is here shown as provided with a rock arm 59 at its outer end, for connection to a remote control lever. Rocking of the rock shaft 57 in one direction thus shifts the clutch collar through the fork 53 in one direction or the other from neutral.

The clutch 54 is shifted by a shift rod 60 having a fork 61 working in a groove in the clutch 54. The shift rod 60 is actuated by a piston 62 working in a cylinder 63 and having its rod 64 provided with a block 65 having a finger or arm 65ª extending into a notch 66 on the hub 67 of the fork 61. The piston 62 is shiftable by air pressure in opposite directions from central position and its movement in one direction, as to the right, against the returning spring 68, and in the other direction, as to the left, against the spring 69. These springs are located in a cylindrical casing 70 around the opposite end of the piston rod to that on which the piston 62 is located. The spring 68 thrusts against an abutment 72 which moves with the piston rod when the piston rod moves to the right and permits the piston rod to slide therethrough when the rod is moved to the left. The spring 69 thrusts against an abutment 71 which moves with the piston rod when the piston rod is moved to the left and permits the piston rod to slide through it when the piston rod is moved to the right. This construction of the shifting cylinder, rod 61 and spring arrangement per se forms no part of this invention, but is generally the same, except for some details, as that shown in Peterson & Deimel Patent No. 2,247,714, issued July 1, 1941. Air entering one end of the cylinder 63 acts on the piston to shift the clutch 54 to the left and air entering the other end of the piston acts to shift the clutch 54 to the right.

In the general operation, to start in first speed forward, the rock shaft 57 is rocked to shift the rod 56 rearwardly or to the right (Figure 1), shifting the clutch collar 45 into interlocking engagement with the race 42 of the overrunning clutch, and to shift into reverse the rock shaft 57 is rocked to shift the rod 56 forward or to the left (Figure 1) from neutral to unclutch the collar 45 from the outer race 42 and shift the gear teeth of the clutch collar 45 into mesh with the gear 51 of the reverse idler. If in either of these operations, the clutch teeth or gear teeth rake because of spinning of the collar or reverse gears, they can be stopped from spinning, as will be hereinafter described.

The feature of this operation is the control system for effecting the shifting of the balking ring clutch or the control of power to the shift cylinder 63. This control system includes electromagnetic means, as solenoids, which, when energized, open valves for permitting the flow of power fluid, as compressed air, from a suitable source to the cylinder 63 on one side or the other of the piston 62, a centrifugal or speed governor switch 80 operated by the output speed of the gearing and controlling circuits leading to the solenoids, throttle controlled switch having two closed positions and operated in conjunction with the engine throttle or the accelerator pedal to close a circuit through the governor switch only when the throttle is in closed or engine idling position to initially energize one solenoid and to close another sustaining circuit for the initially energized solenoid when the throttle is opened, and thus cut out the governor switch, a control circuit for the sustaining circuit, and normally open switches, one of which is closed by the shifting of the piston 62 in one direction from central position, and the other by the shifting of the piston 62 in the opposite direction, to close sustaining circuits to the solenoids respectively. Thus, upon the closing of the operator-operated throttle-controlled switch to its first position occupied only when the throttle is closed, one of the solenoids, dependent upon the position of the speed governor switch, is initially energized, permitting the piston 62 to shift in one direction against the balking ring of the clutch, then as the speeds of the two parts to be clutched together are crossed, and the shifting in completed and the engine accelerated, the throttle controlled switch is shifted to second position, thereby opening the feed circuit through the governor switch and closing the sustaining or stick circuit for the energized solenoid.

The system also includes additional electromagnetic means, as a solenoid, for controlling the flow of power to a brake cylinder, which operates to effect retardation of the input shaft of the gear and a quick crossing of the speeds as the balking ring clutch is being shifted by the piston to balk position.

80 designates generally the speed governor switch and 81, 82 solenoids controlling the flow of power to the cylinder 63, the solenoid 81 controlling the flow of power, as air, to the left hand end of the cylinder, and the solenoid 82, the control of power, to the right hand end of the cylinder (Figure 1). 83 designates an operator-operated or throttle-controlled switch having two positions, in one of which its movable contact 1 is engaged with contact 2 and the other in which it is engaged with contact 3 and it being operated in conjunction with the throttle of the engine to close the circuit through the contacts 1, 2 when the throttle is closed and to close the circuit to the contact 3 when the throttle is open and the engine running above idling speed. These two positions are herein referred to as first and second position. It is operated in conjunction with the throttle, as will be hereinafter described. The contact 2 is connected in the governor switch feed wire circuit through a second speed lock-in switch 84 to be presently described. One outlet wire 86 of the governor is connected through a branch circuit with the solenoid 81 through the closed bridge 87 of a relay I. Assuming that the vehicle is running in first speed and at such a speed that the governor switch 80 is in the second speed range, wherein the contact is made as shown by the chart in Figure 5 between Y and RW and B. If a shift is to be made into second speed, the operator closes the switch 83 to first position, wherein its contact 1 is engaged with contact 2, thus closing the circuit through the governor switch, the bridge 87 of the relay I and the solenoid 81. This is an initiating circuit. The solenoid being thus initially energized opens a suitable valve at 88 (Figure 7) to permit the flow of air from a suitable feed line through passage 89, open valve 88 and outlet 90 thereof to the inlet 91 at the left end of the cylinder 63 and to actuate the piston 62 to the right, but the shift is balked by the balking ring at the right end of the clutch 54, until the speeds of the two parts to be clutched together cross. The crossing of the speeds in an up-shift is effected by deceleration of the engine, and in order to effect a quick deceleration and hence a quick shift, a circuit is provided which is closed by the closing of the contacts 1, 2 of the throttle-controlled switch 83. In a shift up to a second speed, the closing of the second speed solenoid circuit through the governor switch that is through contact Y, RW and B, as shown in Figure 5, and through the closed bridge 87 of relay I also closes a circuit through the winding 92 of a normally open relay V. This closing of the relay V closes a circuit through the closed contacts 1, 2 of the switch 83 through the normally closed bridge 93 of relay III and through the now closed bridge 94 of relay V to a brake solenoid 95.

The brake solenoid 95 opens a valve which permits the flow of air from a suitable source through the passage 89 to a brake cylinder 96 (Figure 3) which applies brake band 27 to the brake drum 26 and thus causes retardation of the input shaft and hence a quick crossing of the speeds of the two parts to be clutched together, so that the balking ring of the clutch 54 is moved to unlocked position and the shifting-in can be completed by the movement of the piston 62 to the right into second speed position. Preferably, the air in its passage to the brake cylinder also passes through pressure reducing valve 97 of any suitable construction. Upon the shifting of the piston 62 to the right, the block 65 thereon through the finger 65ª shifts the shift rod 60 and the fork 61 thereon which coacts with the balking ring clutch 54. The shift into balk position effects the closing of a stick or sustaining circuit for the now energized second speed solenoid 81 from the source 100 through a switch 100, which is closed by the shift to balk position, coil of relay II and throttle switch 83 in first position. The establishing of the stick circuit maintains the circuit through the second speed solenoid 81. The initial establishing of this stick circuit also closes the circuit through the winding 92 of relay V to close the circuit to the brake solenoid 95 through relay III, which is in its normal position. The brake circuit is opened when the throttle switch 83 is operated into second position to energize the coil of relay III, the circuit through the coil of relay III being opened when the shift is made past balk position. The circuits are hereinafter traced in detail. These switches operated by the shift to balk position are located in a switch housing 98 (Figure 2) mounted on the side of a box or housing 99 between the cylinders 63 and 70 and housing the piston rod and shifter block 65 thereon. There are three of the plunger-operated, normally-open switches in the switch housing 98 which are operated by a cam or cams on the shifter block 65. One of these switches, as 100, is used in connection with the second speed solenoid, another, 101, with the third speed solenoid, and the third, 102, with the brake solenoid 95. These switches are operated through plungers 103, 104 and 105 and coact with a cam or cams on the side of the shifter block 65. These cams are provided by forming the block 65 with a groove 106 having inclined sides, the portion of the groove which coacts with the second speed plunger 103 being cut away at 107 so that this plunger will not be actuated when the shift is made to the left (Figure 1) but will be actuated when the shift is made to the right. Likewise the portion of the groove coacting with the third speed plunger 104 is cut away at 108 to form a clearance so that the plunger 104 is not actuated when a shift is made to the right (Figure 1). The plunger 105 which operates the quick shift switch coacts with both sides of the cam groove. The plunger 103 used in connection with the second speed shift is located closer to the left side of the groove (Figure 10) than the right side, so as to be immediately operated to close the switch 100 when the piston 62 is shifted and the balking ring clutch is shifted into balking position toward second speed position. Likewise the plunger 104 used in connection with the third speed shift is located nearer the right hand side of the groove, which may be immediately operated, when a shift is made from central position to balk position toward third speed. The plunger 105 which controls the closing of the switch 102 in the circuit to the brake solenoid is located to be operated when the piston rod is shifted in either direction from central position immediately following the operation of the plunger 103 or 104 to close the switch 100 or 101. Thus, as seen in Figure 10, these plungers are arranged staggered or out of alinement. The closing of the switch 100 closes a circuit direct from the source or battery 109 through closed ignition switch 110 through coil 111 of relay II causing it to close bridge-piece 112 of the relay II and incidentally open the upper bridge-piece 113. The closing of the bridge 112 establishes a sustaining circuit for the second speed solenoid 81, when the switch 83 has been operated into second position by the movement of the accelerator pedal to accelerate the engine and bring contact 1 of switch 83 into engagement with contact 3, it being understood that the engine is accelerated in second speed position after the shift is completed and the throttle kept open beyond idling position. Incidentally, the winding 92 of relay V remains energized and closes its bridge 94 but this is merely incidental as the closing of the bridge 94 only establishes a circuit through the brake solenoid 95 when the switch 83 is in first position with its contacts 1, 2 engaged.

As the speed of the vehicle increases up to within third speed range, the governor switch 80 closes across the contact R B (see the chart, Figure 5). Now if the shift is to be made into third speed, the accelerator pedal is allowed to close into engine idling position, closing switch 83 to first position or causing contact 1 of switch 83 to break engagement with contact 3 and engage contact 2. This breaks the sustaining circuit to the second speed solenoid 81, so that the solenoid 81 is de-energized, operating its valve 70 to permit the air to exhaust from the left end of the cylinder 63 and the spring 71 to immediately return the piston 62 and the balking ring clutch 54 to central position and also the closing of the contacts 1, 2 of switch 83 again cuts in the governor switch. Now the current passes through the governor switch 80 from contact B to R through the upper bridge 113 of relay II to the third speed solenoid 82, causing it to operate its valve 114, permitting air to flow from the source to the right end of the cylinder 63, actuating the piston 62 to the left and shifting the balking ring clutch to the left to balk position and closing the plunger switch 101. A circuit is also closed through bridge 113 of relay II through the winding 115 of relay IV. The energization of this winding closes the bridge 116 of relay IV, which establishes a circuit through the brake solenoid 95, causing the crossing of the speeds brake to be operated, or the brake band 27 to be applied to the brake drum 26 to effect the quick crossing of the speeds and the unlocking of the balking ring clutch, permitting the shifting in of the balking ring to third speed position to be completed by the piston 62. The closing of the third speed plunger switch 101 closes a circuit direct from the battery 109 through the winding 117 of relay I, causing it to close its bridge 118 and incidentally open the bridge 87 used when the shift is being made into second speed. The closing of this bridge 118 establishes a sustaining circuit through the switch 83 when in second position with its contact which engaged with contact 3, this occurring when the accelerator pedal is operated to open the throttle. This operation also separates the contact 1 from contact 2, thus breaking the circuit through the governor switch and to the brake solenoid. The closing of the bridge 118 of relay I also closes a circuit through the winding 115 of relay IV, causing its bridge 116 to establish a feed circuit to the brake solenoid 95, when the throttle is again closed, and the contacts 1, 2 of switch 83 brought into engagement.

Whenever the quick shift plunger switch 102 closes, a circuit is established direct from the battery through the ignition switch through the winding 119 of relay III, causing its bridge 93 to open and thus cut out any circuits controlled by the relays IV and V, which circuits control the energization of the brake solenoid 95.

To shift down from a higher to a lower speed, acceleration of the engine is required to cross the speeds. Assuming the shift is to be made from third to second, and when in this shifted position, quick shift plunger switches 102 are closed, and the third speed solenoid 82 energized. The piston 62 is at the left end of the cylinder 63 and the balking ring clutch 54 in its left hand shifted position. The governor switch 80 may be in the third speed range or the second speed range, or in the first speed range. Assume that it is in the third speed range. However, the governor switch is cut out of the circuit because of the throttle being open, the contact 1 of switch 83 engaged with contact 3. To make the shift, the operator closes the throttle and thus closes contact 1 into engagement with contact 2 of switch 83. This decelerates the engine and brings the speed down into second speed range and so cuts the governor switch into a closed circuit and also breaks the sustaining circuit for the third speed solenoid, so that the spring 59 is free to re-act and return the piston 62 to central position in the cylinder 63, thus moving the balking ring clutch to central position. The closing of the contacts 1, 2 of switch 83 cuts in the governor switch 80, and the governor switch being now in the second speed range, the second speed solenoid 81 is initially energized through the governor switch, and the balking-ring clutch 54 shifted to balking position to the right (Figure 1). This shift closing the second speed plunger switch 100 establishing the sustaining circuit for the second speed solenoid 81, upon the acceleration of the engine. The acceleration of the engine brings the switch 83 to second position wherein contact 1 is engaged with contact 3 establishing the sustaining circuit and also breaking the circuit to the brake solenoid 95 controlled by the relays IV, V. In shifting down, as from second to third, when the second speed solenoid 81 is energized through the governor switch 80 and the clutch 54 moved to balk position, the throttle is immediately opened, breaking the circuit through the bridge 93 of the relay III to the relays IV, V which control the brake solenoid 95 is immediately broken by the opening of the throttle to accelerate the engine, and when the speeds cross the shifting in is completed. The shift from second to first is effected by closing the throttle and the switch 83 to first position wherein contacts 1, 2 of throttle switch 83 are engaged, and as the governor switch is then running in the first speed range and not in the second speed range, no circuit is completed to the speed solenoids but by moving the switch 83 to throttle closing position, the sustaining circuit for the solenoid 81 is broken, and hence the balking ring clutch 54 returned to central position by the spring acting on the piston 62.

In all forward speeds, the clutch collar 45 through which first speed and reverse are obtained, is in first speed position, and as the drive in first speed is through an overrunning clutch consisting of inner and outer raceways 41, 42 and rollers 43, the first speed drive overruns the output shaft 29 when in second and third speed.

A second speed lock-in switch 84 previously mentioned is preferably provided and operable to cut out the governor switch 80, this having three terminals or contacts 4, 5, 6, contact 4 being shiftable and normally engaging contact 5 and shiftable by the operator into engagement with contact 6, and thus cut out the governor switch 80. The lock-in switch 84 is provided so that a shift can be held in second speed, regardless of the vehicle speed or the throttle opening. Thus, second speed can be held engaged, so as to use the engine as a brake, when descending a hill. Also, in climbing a hill, this switch may be used to shift down to second at a higher vehicle speed than the governor 80 would require.

The brake operated by the solenoid 95 is also used for engaging first speed forward or reverse to stop the parts to be clutched together from spinning, and thus preventing raking of the clutch teeth. For this operation, the brake should not be applied when the throttle is open. Therefore, it can be applied only through the switch 83 when the throttle is closed, and the switch 83 in first position with its contact 1 engaged with contact 2. To operate the brake 27 to facilitate a shift into first or reverse, a circuit is provided which is closed by a normally-open, manually operable switch 121. Upon closing this switch, a circuit to the brake solenoid 95 is established through the contacts 1, 2 of the throttle operated switch, normally closed bridge 93 of relay III to one terminal of the switch 121 across the closed switch member to the other terminal, and then to the brake cylinder. As the circuit to the switch 121 can be closed only when the bridge 93 of relay III is closed, and as the bridge 93 is opened by its coil 119 when the clutch 54 is in shifted position, the brake solenoid can not be energized to use the brake as a vehicle brake or the brake solenoid 95 can not be energized through the manual switch 121 except when the clutch 54 is in neutral and the switch 83 in first or throttle closed position.

The initiating circuit for the second speed solenoid 81 is as follows: from source 109 through closed ignition switch 110, wires 122, 123, switch 83, when in first position, wires 124 through the second speed lock-in switch 84, when in normal position with contacts 4, 5 engaged, wire 126 through the governor switch 80, which is in second speed position, wire 86, upper normally closed bridge 87 of relay I, wire 127 to the second speed solenoid 81. The solenoid 81 opens a valve which permits the flow of air to the left end of the cylinder 63 and acting on the piston 62 to shift the balking ring clutch to the right into balk position closing plunger switch 100.

This establishes a control circuit as follows for the sustaining circuit for the solenoid 81: from source 109, wire 122, winding 111 of relay II, wire 136 through the closed switch 100 to the return wire or ground. The energizing of the coil 111 of relay II closes its bridge-piece 112, thus establishing a sustaining circuit for the solenoid 81, as follows: source 109, wires 122, 123 through switch 83 which is operated into second position through the contacts 1, 3, wires 137, 138, 139, bridge 112, wire 127 to the solenoid 81.

The energizing circuit for the brake solenoid 95 is as follows: from source 109, wires 122, 123 through switch 83 when in first position, with contacts 1, 2 engaged, wires 124, 125, normally closed bridge 93 of relay III, wires 131, 132 through closed bridge 94 of relay V, wires 133, 134, 135 through the solenoid to the return wire or ground. The coil 92 of the relay V is energized through wire 129 when the initiating circuit is first closed, and also when the sustaining circuit is closed through the bridge 112. The energizing circuit for the brake solenoid 95 is broken by the closing of the plunger switch 102 by a circuit established through the switch 102 as follows: source 109, wires 122 to the winding 119 of relay III, thence through wire 141 through the plunger switch 102 to return wire or ground. As the switch 102 closes, slightly after the second speed solenoid switch 101 (or the third speed solenoid 101) closes, the circuit of the brake solenoid is only momentarily closed and the brake only momentarily applied when the clutch is in balk position. This is due to the different spacing of the plungers for the switches 101, 102 from the walls of the cam groove.

The initiating circuit for the third speed solenoid 82 is as follows: from source 109 through wires 122, 123, switch 83, when in first position, wire 124 through the second speed lock-in switch 84, wire 26 through the governor switch 80, when in third speed range across the contacts B R, wire 142 through closed bridge 113 of relay II, through wire 143, to the third speed solenoid to the return wire or ground. At the same time, a circuit is established from the closed bridge 113 through wire 144, winding 115 of relay IV, wire 130 to the return wire or ground, thus closing the bridge 116 of relay IV.

The control circuit for the sustaining circuit of the third speed solenoid 82 is as follows: source 109, wire 122, winding 117 of relay I, thence through plunger switch 101 to return wire or ground, the switch 103 being closed upon the shifting of the balking ring clutch to the left to balk position. Upon the energization of the initiating circuit, the sustaining circuit for the third speed solenoid is established, when the throttle control switch 83 is shifted to second position: from source 109, wires 122, 123, contact 3 of switch 83, wires 137, 138 to the closed bridge 118 of relay I, which has been closed by the energization of the coil 117, thence through wire 143 to the third speed solenoid 82 and also through wire 144 to the coil 115 of relay IV, causing the bridge 116 to close. With the switch 83 still in first position, the energizing circuit for the brake solenoid 95 is established, substantially as before, from the source 109, wire 102 through the switch 83 in first position, wires 124, 125 through the normally closed bridge 93 of relay III, wire 131, closed bridge 116 of relay IV, wires 134, 135 to the brake solenoid, and thence to the return wire or ground. This is also only a momentary energization of the brake solenoid 95, caused by the closing of the third speed plunger switch 101 slightly in advance of the closing of the quick shift plunger switch 102. The closing of the plunger switch 102 establishes a circuit from a source through the winding 119 of the relay III operating this relay to open the bridge 93 in the brake solenoid circuit 95, so that the brake is applied only momentarily.

A shift can be made from neutral into first or reverse, when the engine is running, only when the switch 83 is in first position. The circuit is as follows: from the source 109 through the switch 83, as before when in first position, wires 124, 125, closed bridge 93 of relay III, wires 131, 132, 132ª through the switch 121, when closed by the operator, thence through wires 135ª, 135 through the brake solenoid 95 to the return wire or ground. When in third speed to shift to second speed, the second speed lock-in switch 84 is shifted by the operator to separate the contacts 4, 5 and engage the contacts 4, 6. Now upon closing of the switch 83 to first position, the sustaining circuit for the third speed solenoid is opened, if the vehicle is running in third speed and the solenoid 82 energized, and establishes a circuit through the contacts 4, 6 of the lock-in switch 84 through the second speed solenoid, cutting out the governor switch 80. The closing of the throttle controlled switch 83 to second position will maintain the sustaining circuit for the second speed solenoid. To return the control back to normal, the lock-in switch 84 is released, so that the control shifts back to the governor switch 80 in connection with the foot throttle switch 83.

The governor switch 80 is of any well known construction and is actuated from the output shaft through the worm gear 33 and the shaft on which it is mounted (Figures 1 and 2). It is of the centrifugal type and of the same general nature as shown in Patents Nos. 2,357,284 issued September 5, 1944, and 2,360,976 issued October 24, 1944, to Peterson and Deimel.

What we claim is:

1. A control system for change speed gearing actuated by a throttle controlled engine, and including input and output shafts, a balking ring clutch, power means for shifting in the clutch, and means tending to shift out the clutch when the power is released; said system including an electro-responsive device for controlling the flow of power to and from the shift means, a governor switch operated by the output shaft, a throttle controlled switch having a first throttle closed position and a second throttle open position, a switch closable by the shifting of the clutch to balk position, an initiating circuit for the electro-responsive device including the governor switch when in a predetermined speed range and the throttle control switch when in first position only, and a sustaining circuit including the throttle controlled switch when in second position only, and a normally open switch closed by means operated by the closing of said switch which is closed by the shifting of the clutch to balk position.

2. A control system for change speed gearing actuated by a throttle controlled engine, and including input and output shafts, a double balking ring clutch shiftable in opposite directions from neutral to effect different speed shifts, power means for shifting the clutch, and means tending to shift out the clutch when the power is released; said system including electro-responsive devices for controlling the flow of power to and from the shift means, one when the shift is in one direction and the other when the shift is in the opposite direction, a governor switch operated by the output shaft, a throttle controlled switch having a first, throttle closed position and a second, throttle open position, switches closable by the power shifting of the clutch to balk position, one being closed when the shift is in one direction from neutral and the other when the shift is in the opposite direction, initiating circuits for the electro-responsive devices respectively including the governor switch when in predetermined speed ranges, one when the governor switch is in one speed range and the other when in another speed range, and also including the throttle switch when in first position only, and sustaining circuits for said devices respectively including the throttle control switch when in second position only, each sustaining circuit also including a normally open switch closed by means operated by the closing of the said switch which is closed by the shifting of the clutch to balk position.

3. A control system for change speed gearing actuated by a throttle controlled engine, and including input and output shafts, a balking ring clutch, power means for shifting in the clutch, and means tending to shift out the clutch when the power is released; said system including an electro-responsive device for controlling the flow of power to and from the shift means, a governor switch operated by the output shaft, a throttle controlled switch having a first throttle closed position and a second throttle open position, a switch closable by the shifting of the clutch to balk position, an initiating circuit for the electro-responsive device including the governor switch when in a predetermined speed range and the throttle control switch when in first position only, and a sustaining circuit including the throttle controlled switch when in second position only, and a normally open switch closed by means operated by the closing of said switch which is closed by the shifting of the clutch to balk position, power operated brake means for retarding the input shaft, the system also including means operated by the throttle controlled switch when in first position only for controlling the operation of the power brake means and by the shifting of the clutch to balk position to disable the power brake means.

4. A control system for change speed gearing actuated by a throttle controlled engine, and including input and output shafts, a double balking ring clutch shiftable in opposite directions from neutral to effect different speed shifts, power means for shifting the clutch, and means tending to shift out the clutch when the power is released, said system including electro-responsive devices for controlling the flow of power to and from the shift means, one when the shift is in one direction and the other when the shift is in the opposite direction, a governor switch operated by the output shaft, a throttle controlled switch having a first, throttle closed position and a second, throttle open position, switches closable by the power shifting of the clutch to balk position, one being closed when the shift is in one direction from neutral and the other when the shift is in the opposite direction, initiating circuits for the electro-responsive devices respectively including the governor switch when in predetermined speed ranges, one when the governor switch is in one speed range and the other when in another speed range, and also including the throttle switch when in first position only, and sustaining circuits for said devices respectively including the throttle control switch when in second position only, each sustaining circuit also including a normally open switch closed by means operated by the closing of the said switch which is closed by the shifting of the clutch to balk position, power operated brake means for retarding the input shaft, the system also including means operated by the throttle controlled switch when in first position only for controlling the operation of the power brake means and by the shifting of the clutch to balk position to disable the power brake means.

5. A control system for change speed gearing actuated by a throttle controlled engine and including input and output shafts, a balking ring clutch, power means for shifting in the clutch, and means tending to shift out the clutch when the power is released; said system including an electro-responsive device for controlling the flow of power to and from the shift means, a governor switch operated by the output shaft, a throttle controlled switch having a first throttle closed position and a second throttle open position, a a switch closable by the shifting of the clutch to balk position, an initiating circuit for the electro-responsive device including the governor switch when in a predetermined speed range and the throttle control switch when in first position only, and a sustaining circuit including the throttle controlled switch when in second position only, and a normally open switch closed by means operated by the closing of said switch which is closed by the shifting of the clutch to balk position, power operated brake means for retarding the input shaft, the system also including means operated by the throttle controlled switch when in first position only for controlling the operation of the power brake means and by the shifting of the clutch to balk position to disable the power brake means, additional means for effecting the operation of the brake means including the throttle controlled switch when in first position only, the governor switch when in low speed range only, and a cut-out switch operable by the closing of the initiating and sustaining circuits for the power shift means, to open the brake circuit through the driver operated switch.

6. A control system for change speed gearing actuated by a throttle controlled engine, and including input and output shafts, a balking ring clutch, power means for shifting in the clutch, means tending to shift out the clutch when the power is released, and power operated brake means operable to retard the input shaft, said system including electro-responsive devices for controlling the flow of power to and from the shift and the brake means respectively, a governor switch operated by the output shaft, a throttle controlled switch having a first throttle closed position and a second throttle open position, switches closable successively by the shifting of the clutch to balk position, an initiating circuit for the electro-responsive device for the power shift, means including the governor switch when in a predetermined speed range and the throttle controlled switch when in first position only, a sustaining circuit including the throttle controlled switch when in second position only and a normally open switch closed by means operated by the closing of the first of the successively operable switches, an energizing circuit for the brake electro-responsive device including the throttle controlled switch when in first position only and a normally closed switch operable to open position by means controlled by the closing of the second of the successively closable switches, a second energizing circuit for the brake electro-responsive device also including the throttle controlled switch when in first position only, and also including a normally open, manually closable switch and the governor switch when in low speed range, and a cut-out switch operable by the closing of the initiating and energizing circuits for the power shift means to break the circuit to the brake means through the manually closable switch.

7. A control system for change speed gearing actuated by a throttle controlled switch and including input and output shafts, a double balking ring clutch shiftable in opposite directions from neutral to effect different gear shifts, power means for shifting in the clutch, means tending to shift out the clutch when the power is released, and power operated brake means operable to retard the input shaft, said system including two electro-responsive devices for controlling the flow of power to and from the shift means to effect the shift in opposite directions, one for effecting the shift in one direction and the other for effecting the shift in the opposite direction, a third electro-responsive device for controlling the flow of power to and from the brake means, a governor switch operated by the output shaft, a throttle controlled switch having a first throttle closed position and a second throttle open position, two switches closable by the shifting of the clutch to balk position, one being closed when the shift is in one direction from neutral, and the other when the shift is in the opposite direction, a third switch operable by the shifting to balk position when the shift is in either direction, successive to one of the two switches, an initiating circuit for the electro-responsive device controlling the shift means, both including the governor switch when in predetermined speed ranges, one when the governor switch is in one speed range and the other when in another speed range, and also including the throttle controlled switch when in first position only, sustaining circuits for said two devices respectively including the throttle controlled switch when in second position only, each sustaining circuit also including a normally open switch closed by means operated by the closing of the first of said successively operated switches when the shift is in one direction, an energizing circuit for the brake electro-responsive device including the throttle controlled switch when in first position only and also including a normally closed switch operable to open position by means controlled by the closing of the second of the successively operated switches.

8. A control system for change speed gearing actuated by a throttle controlled switch and including input and output shafts, a double balking ring clutch shiftable in opposite directions from neutral to effect different gear shifts, power means for shifting in the clutch, means tending to shift out the clutch when the power is released, and power operated brake means operable to retard the input shaft, said system including two electro-responsive devices for controlling the flow of power to and from the shift means to effect the shift in opposite directions, one for effecting the shift in one direction and the other for effecting the shift in the opposite direction, a third electro-responsive device for controlling the flow of power to and from the brake means, a governor switch operated by the output shaft, a throttle controlled switch having a first throttle closed position and a second throttle open position, two switches closable by the shifting of the clutch to balk position, one being closed when the shift is in one direction from neutral, and the other when the shift is in the opposite direction, a third switch operable by the shifting to balk position when the shift is in either direction, successive to one of the two switches, an initiating circuit for the electro-responsive device controlling the shift means, both including the governor switch when in predetermined speed ranges, one when the governor switch is in one speed range and the other when in another speed range, and also including the throttle controlled switch when in first position only, sustaining circuits for said two devices respectively including the throttle controlled switch when in second position only, each sustaining circuit also including a normally open switch closed by means operated by the closing of the first of said successively operated switches when the shift is in one direction, an energizing circuit for the brake electro-responsive device including the throttle controlled switch when in first position only and also including a normally closed switch operable to open position by means controlled by the closing of the second of the successively operated switches, an additional energizing circuit for the brake electro-responsive device also including the throttle controlled switch when in first position only and also a normally open manually closable switch and the governor switch when in low speed range only.

9. A control system for change speed gearing actuated by a throttle controlled switch and including input and output shafts, a double balking clutch shiftable in opposite directions from neutral to effect different gear shifts, power means for shifting in the clutch means tending to shift out the clutch when the power is released, and power operated brake means operable to retard the input shaft, said system including two electro-responsive devices for controlling the flow of power to and from the shift means to effect the shift in opposite directions, one for effecting the shift in one direction and the other for effecting the shift in the opposite direction, a third electro-responsive device for controlling the flow of power to and from the brake means, a governor switch operated by the output shaft, a throttle controlled switch having a first throttle closed position and a second throttle open position, two switches closable by the shifting of the clutch to balk position, one being closed when the shift is in one direction from neutral, and the other when the shift is in the opposite direction, a third switch operable by the shifting to balk position when the shift is in either direction, successive to one of the two switches, an initiating circuit for the electro-responsive device controlling the shift means, both including the governor switch when in predetermined speed ranges, one when the governor switch is in one speed range and the other when in another speed range, and also including the throttle controlled switch when in first position only, sustaining circuits for said two devices respectively including the throttle controlled switch when in second position only, each sustaining circuit also including a normally open switch closed by means operated by the closing of the first of said successively operated switches when the shift is in one direction, an energizing circuit for the brake electro-responsive device including the throttle controlled switch when in first position only and also including a normally closed switch operable to open position by means controlled by the closing of the second of the successively operated switches, an additional energizing circuit for the brake electro-responsive device also including the throttle controlled switch when in first position only and also a normally open manually closable switch and the governor switch when in low speed range only, and a cut-out switch operable by the closing of the initiating and energizing circuits for the power shift means to break the circuit through the manually closable switch.

10. A control system for change speed transmission gearing actuated by a throttle controlled engine and including input and output shafts, a shiftable balking ring clutch, power means for shifting in the clutch, means tending to shift out the clutch when the power is released and power operated brake means operable to retard the input shaft; said system including electro-responsive devices for controlling the flow of power to and from the power shift means and the power brake means respectively, an initiating circuit and a sustaining circuit for the electro-responsive device for the power shift means, a control circuit for the sustaining circuit, an energizing circuit for the electro-responsive device for the brake means, a throttle controlled switch having a first position when the throttle is closed and a second position when the throttle is open, switches closable successively by the shifting of the clutch to balk position, a governor switch operated by the output shaft and connected in the initiating circuit and to a source of energy in series with the throttle controlled switch only when the latter is in first position, the sustaining circuit being connected to said source only when the throttle controlled switch is in second position and having a normally open relay switch therein, the control circuit being connected to the source through the first operated of the successively closable switches and having a coil therein to close said relay, the energizing circuit for the brake means being connected to the source through the throttle controlled switch only when the latter is in first position and including a normally closed relay switch and a cut-out circuit connected to the source and to the second of the successively operated switches and having a coil therein for opening the normally closed relay in the energizing circuit for the brake means.

CARL D. PETERSON.
ALBERT H. DEIMEL.